United States Patent [19]

Lee

[11] Patent Number: 5,548,188

[45] Date of Patent: Aug. 20, 1996

[54] APPARATUS AND METHOD FOR CONTROLLING ILLUMINATION OF LAMP

[75] Inventor: Eung-Hwa Lee, Seoul, Rep. of Korea

[73] Assignee: Samsung Electronics Co., Ltd., Suwon, Rep. of Korea

[21] Appl. No.: 126,779

[22] Filed: Sep. 27, 1993

[30] Foreign Application Priority Data

Oct. 2, 1992 [KR] Rep. of Korea ............... 92-18151
Oct. 16, 1992 [KR] Rep. of Korea ............... 92-19057

[51] Int. Cl.[6] .................................................. H05B 37/02
[52] U.S. Cl. ........................... 315/156; 315/150; 315/155; 315/307; 315/247
[58] Field of Search ........................... 315/150, 155, 315/156, 158, 291, 307, DIG. 7, 247

[56] References Cited

U.S. PATENT DOCUMENTS

| | | | |
|---|---|---|---|
| 4,273,999 | 6/1981 | Pierpoint | 315/158 |
| 4,277,728 | 7/1981 | Stevens | 315/291 |
| 4,346,331 | 8/1982 | Hoge | 315/158 |
| 4,368,406 | 1/1983 | Kruzich et al. | 315/291 |
| 4,464,606 | 8/1984 | Kane | 315/158 |
| 4,682,084 | 7/1987 | Kuhnel | 315/158 |
| 4,873,469 | 10/1989 | Young et al. | 315/158 |
| 4,904,906 | 2/1990 | Atherton et al. | 315/291 |
| 4,952,849 | 8/1990 | Fellows et al. | 315/307 |
| 4,999,347 | 3/1991 | Ottenstein | 315/158 |
| 5,130,613 | 7/1992 | Szuba | 315/158 |
| 5,189,393 | 2/1993 | Hu | 315/158 |
| 5,220,250 | 6/1993 | Szuba | 315/291 |

FOREIGN PATENT DOCUMENTS 2-103897 4/1990 Japan .

*Primary Examiner*—Robert Pascal
*Assistant Examiner*—Darius Gambino
*Attorney, Agent, or Firm*—Burns, Doane, Swecker & Mathis, L.L.P.

[57] ABSTRACT

An apparatus and a method for controlling an illumination of a lamp. The apparatus comprises an illumination detecting circuit for detecting an ambient illumination, a human body detecting circuit for detecting an infrared-ray radiated from a body of the user, a microcomputer for comparing the detected ambient illumination with an illumination preset therein and outputting a pair of first control signals and a second control signal in accordance with the compared result, each of the first control signals having a frequency which is varied according to the compared result, the second control signal having a first or second level according to the compared result, the microcomputer discriminating in response to an output signal from the human body detecting circuit whether the user is present around the lamp and muting the output of the first control signals when the user is not present around the lamp, so as to turn off the lamp, a power factor enhancing circuit for allowing a lamp drive voltage and a lamp drive current to be in phase with each other, and a lamp driving circuit having a pair of switching circuits for controlling the flow of the drive current to the lamp in response to the first control signals from the microcomputer and a high voltage charging circuit charged with the drive current.

14 Claims, 5 Drawing Sheets

APPARATUS AND METHOD FOR CONTROLLING ILLUMINATION OF LAMP

BACKGROUND OF THE INVENTION

1. Field of the Invention

The present invention relates in general to the control of illumination of a lamp, and more particularly to an apparatus and a method for controlling the illumination of the lamp, in which the illumination of the lamp is controlled suitably to a condition around the lamp and a high power factor is always maintained regardless of a variation in a load.

2. Description of the Prior Art

Conventional illumination equipments comprise lamp illumination control means which is artificially operable by the user. When an illumination of a lamp is varied with a variation in an ambient illumination or in a commercial alternating current (AC) power, the lamp illumination control means may be operated by the user to control the illumination of the lamp appropriately by raising or lowering it. In this case, the user has the trouble of frequently operating the lamp illumination control means since the ambient illumination and the commercial AC power may be varied at any time.

Also, in the case where the illumination of the lamp is artificially raised by the user because of a variation in a voltage or a low ambient illumination, a lamp drive current is abruptly increased in amount, resulting in generation of a phase difference between the lamp drive current and a lamp drive voltage. The generation of the phase difference makes a power factor bad.

Further, even when the user is absent for a long time, lighting of the lamp is continuously maintained resulting in an unnecessary power consumption.

In order to solve the above problems, there have recently been proposed apparatus for controlling the lighting of the lamp, and one example thereof is disclosed in Japanese Patent Laid-open Publication No. Heisei 2-103897 and is shown in FIG. 1, herein.

As shown in FIG. 1, the conventional lighting control apparatus comprises a human body detecting circuit 112, a power supply circuit 113 and a control circuit 114 to control the lighting of the lamp 111. The human body detecting circuit 112 includes an infrared-ray sensor 115, an amplifier 116 and a level discriminator 117. The infrared-ray sensor 115 senses an infrared-ray in an illumination control area and converts the sensed infrared-ray into a voltage. The amplifier 116 amplifies the output voltage from the infrared-ray sensor 115 by a predetermined level. The level discriminator 117 compares the output voltage from the amplifier 116 with a reference voltage. If the output voltage from the amplifier 116 is higher than the reference voltage in accordance with the compared result, the level discriminator 117 outputs a human body detect signal indicative of the presence of a man in the illumination control area.

The conventional lighting control apparatus has the effect of controlling actuation of the lamp according to the detection of the presence of the user in the illumination control area. However, the conventional lighting control apparatus is desirable to interrupt a power supply path from the power supply circuit, but has the disadvantage that it cannot be applied to a switching mode power supply (SMPS) system.

SUMMARY OF THE INVENTION

Therefore, the present invention has been made in view of the above problems, and it is an object of the present invention to provide an apparatus and a method for controlling illumination of a lamp, in which an ambient illumination is detected and the illumination of the lamp is controlled on the basis of the detected ambient illumination, so that a user's eyesight can be protected from the illumination of the lamp.

It is another object of the present invention to provide an apparatus and a method for controlling illumination of a lamp, in which presence of the user around the lamp is detected and the lamp is turned off in the user's absence as a result of the detection, so that an unnecessary power consumption can be reduced.

It is yet another object of the present invention to provide an apparatus and a method for controlling illumination of a lamp, in which a lamp drive voltage is in phase with a current flowing through the lamp when the lamp remains at its lighted state or the illumination thereof is varied manually or automatically, so that a power factor can be enhanced.

In accordance with one aspect of the present invention, there is provided an apparatus for controlling illumination of a lamp, comprising means for detecting an ambient illumination; means for detecting an infrared-ray radiated from a body of the user to discriminate whether the user is present around the lamp and generating a signal indicative of presence of the user around the lamp in accordance with the detected result; control means for comparing the detected ambient illumination from said illumination detecting means with an illumination preset therein and outputting a pair of first control signals and a second control signal in accordance with the compared result, each of the first control signals having a frequency which is varied according to the compared result, the second control signal having a first or second level according to the compared result, said control means discriminating in response to an output signal from said infrared-ray detecting means whether the user is present around the lamp and muting the output of the first control signals when the user is not present around the lamp as a result of the discrimination, so as to turn off the lamp; means for rectifying a commercial AC voltage into a DC voltage; power factor enhancing means having a smoothing capacitor charged with the DC voltage from said rectifying means, a switching signal generator enabled in response to the second control signal of the first level from said control means and disabled in response to the second control signal of the second level from said control means, for generating a switching signal when the voltage charged on said smoothing capacitor is out of phase with a drive current discharged from said smoothing capacitor to the lamp, a switching device driven in response to the switching signal from said switching signal generator and a transformer for generating a high voltage when said switching device is driven, said power factor enhancing means allowing the charged voltage on said smoothing capacitor and the drive current discharged therefrom to the lamp to be in phase with each other; and lamp driving means having a pair of switching circuits for controlling the flow of the drive current from said smoothing capacitor in said power factor enhancing means to the lamp in response to the first control signal from said control means and a high voltage charging circuit charged with the drive current from said smoothing capacitor; said control means outputting the first control signals of higher frequencies and the second control signal of the first level if it is discriminated that the present illumination is higher than the detected ambient illumination from said illumination detecting means and outputting the first control signals of lower frequencies and the second control signal of the second level if it is discriminated that the preset illumination is lower than the detected ambient illumination from said illumination detecting means.

In accordance with another aspect of the present invention, there is provided a method of controlling illumination of a lamp, comprising an illumination detecting step of detecting an ambient illumination; an illumination control step of outputting a pair of first control signals of higher frequencies to lamp driving means to increase an amount of a lamp drive current and outputting a second control signal of a first level to power factor enhancing means to raise the illumination of the lamp, if the ambient illumination detected at said illumination detecting step is lower than a preset illumination, and outputting the first control signals of lower frequencies to said lamp driving means to reduce the amount of the lamp drive current and outputting the second control signal of a second level to said power factor enhancing means to lower the illumination of the lamp, if the ambient illumination detected at said illumination detecting step is higher than the preset illumination; a user detecting step of detecting an infrared-ray radiated from a body of the user to discriminate whether the user is present around the lamp; and a lamp turning off step of outputting the second control signal of the second level to said power factor enhancing means and muting the output of the first control signals, if it is discriminated at said user detecting step that the user is not present around the lamp, so as to turn off the lamp.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
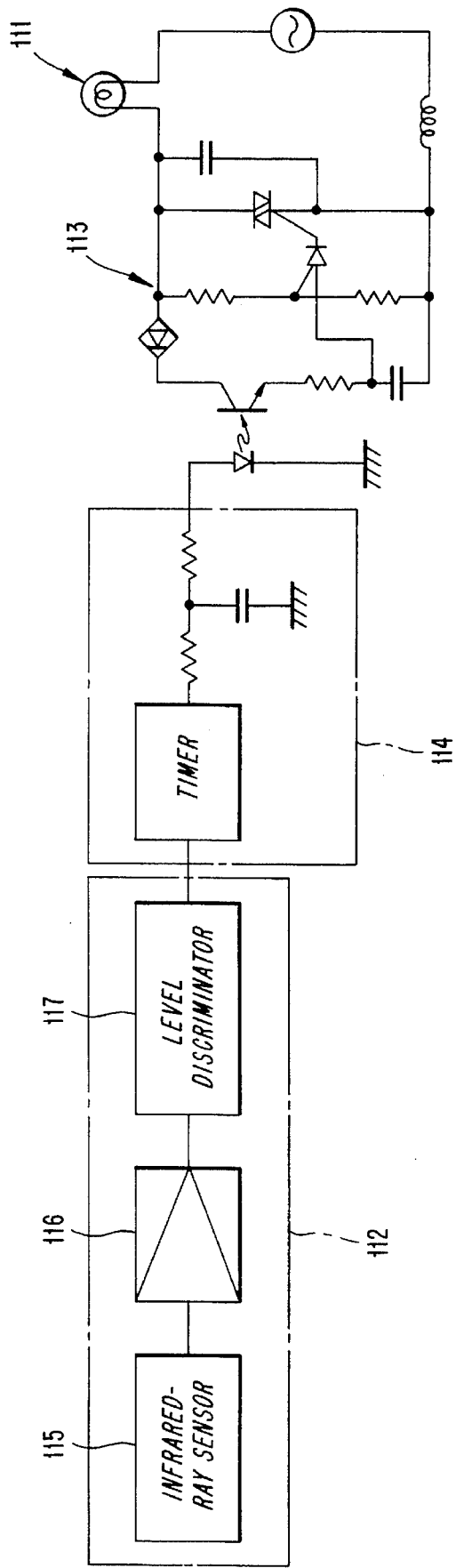
FIG. 1 is a circuit diagram of a conventional apparatus for controlling lighting of a lamp.
Figure 2:
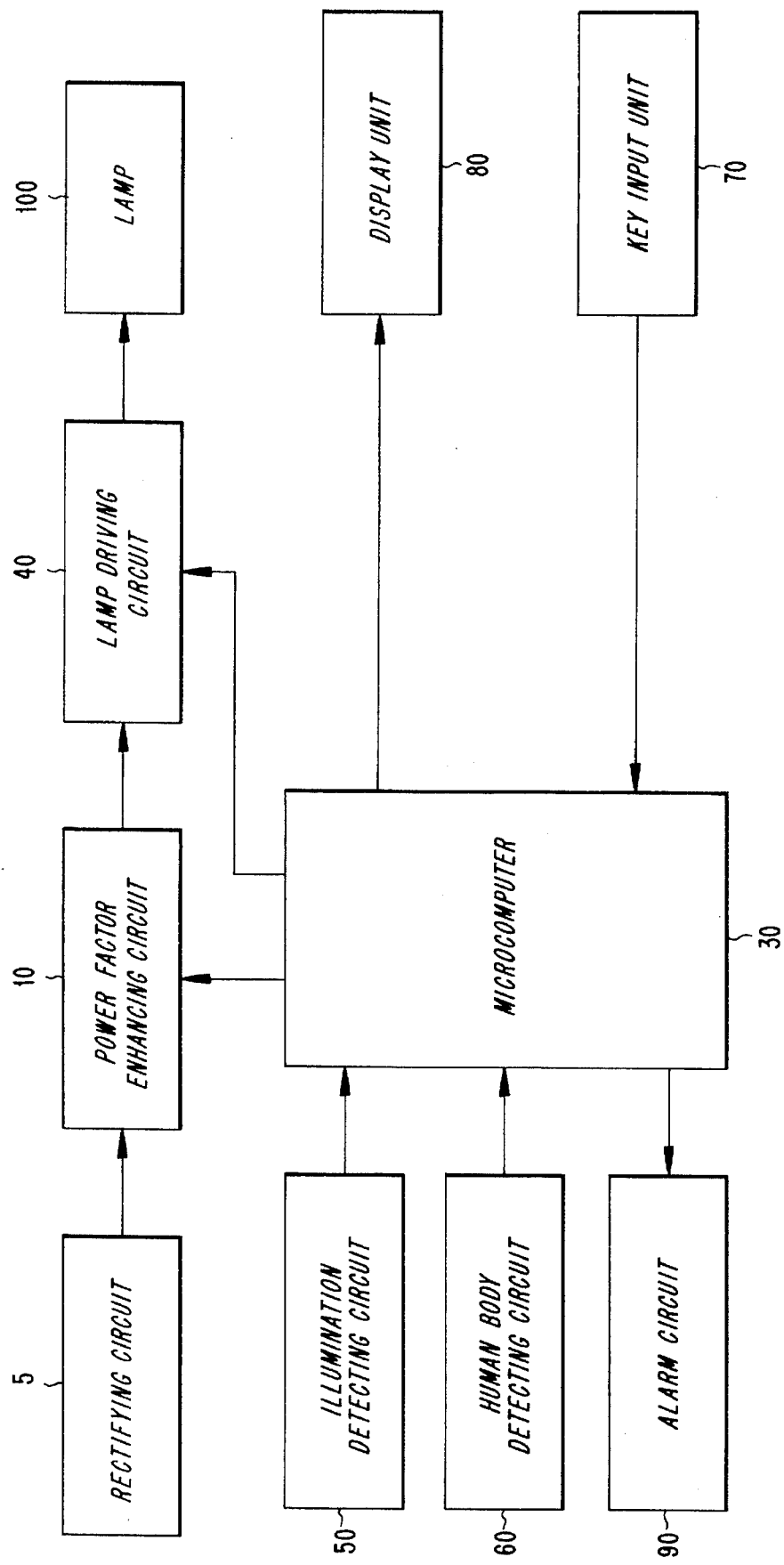
FIG. 2 is a block diagram of an apparatus for controlling illumination of the lamp in accordance with an embodiment of the present invention.
Figure 3:
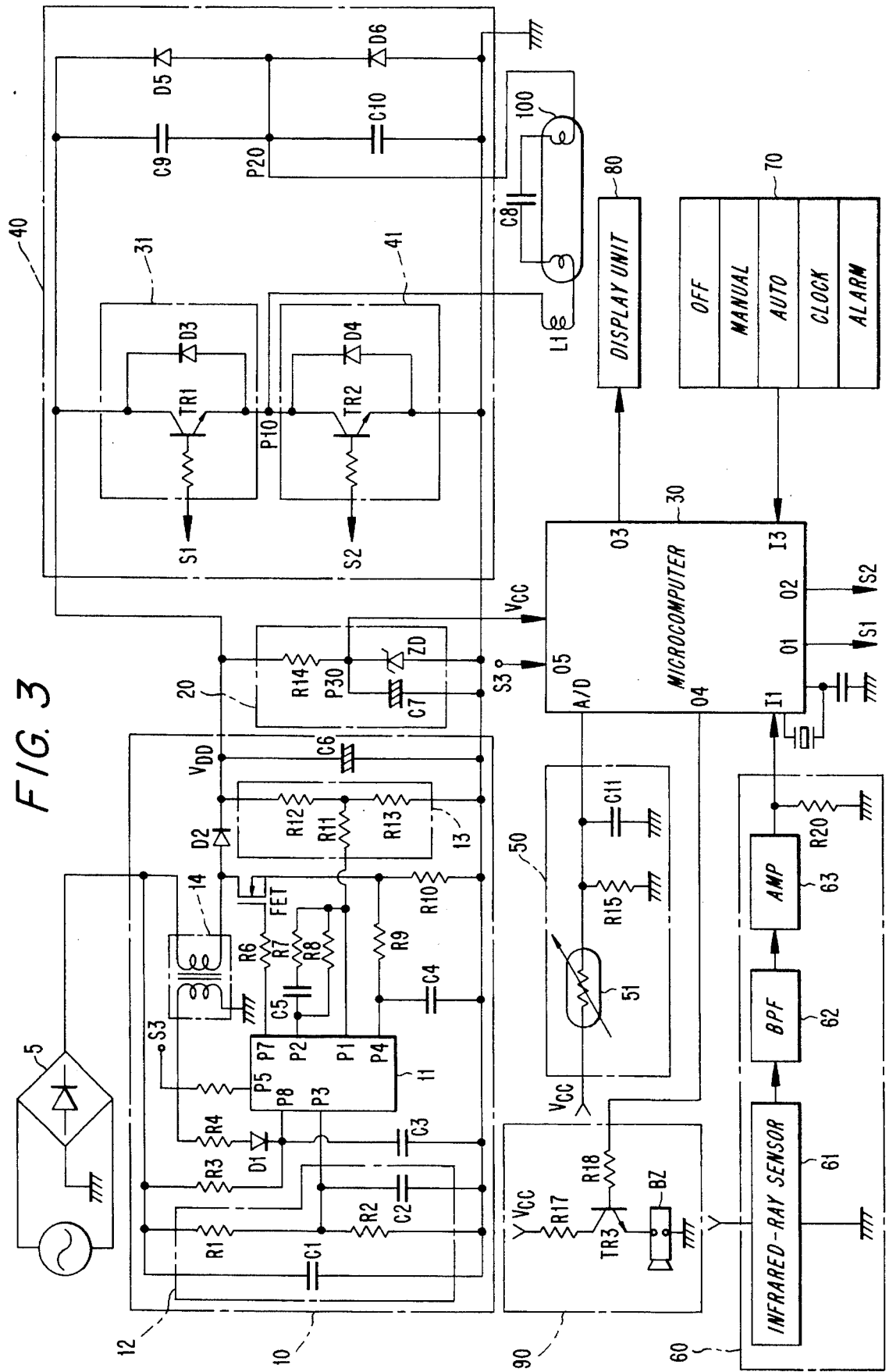
FIG. 3 is a detailed circuit diagram of the apparatus in FIG. 2 in accordance with the embodiment of the present invention.

FIG. 2 is a block diagram of an apparatus for controlling an illumination of a lamp in accordance with an embodiment of the present invention and FIG. 3 is a detailed circuit diagram of the apparatus in FIG. 2 in accordance with the embodiment of the present invention. As shown in these drawings, the lamp illumination control apparatus of the present invention comprises a rectifying circuit 5 for full wave-rectifying a commercial AC power into a DC power.

A power factor enhancing circuit 10 has such a construction as to allow a voltage supplied to the lamp and a current flowing through the lamp to be in phase with each other. Namely, the power factor enhancing circuit 10 includes a smoothing capacitor C6 for smoothing a DC voltage from the rectifying circuit 5 because a ripple component is contained in the DC voltage from the rectifying circuit 5. Also, the power factor enhancing circuit 10 includes a MOSFET as a switching device and a switching signal generator 11 for controlling the MOSFET according to an external condition. The switching signal generator 11 may include, for example, a Model KA7514 IC chip as a logic element. The power factor enhancing circuit 10 is connected to a lamp driving circuit 40 for driving the lamp 100. The power factor enhancing circuit 10 is also connected to a constant voltage circuit 20 for outputting a constant voltage regardless of a variation in a load. The constant voltage from the constant voltage circuit 20 is applied as an operating voltage to a microcomputer 30.

The power factor enhancing circuit 10 also includes a transformer 14 connected to an output of the rectifying circuit 5. The transformer 14 has a primary coil connected through the MOSFET and a resistor R10 connected to a ground and also through a diode D2 to one side of the smoothing capacitor C6, the other side of which is connected to the ground. With this construction, the DC voltage from the rectifying circuit 5 is charged on the smoothing capacitor C6 through the primary coil of the transformer 14. The smoothing capacitor C6 is connected in parallel to a charged voltage detector 13 which is comprised of resistors R12 and R13. The charged voltage on the smoothing capacitor C6 is detected on the basis of a voltage divided by the resistors R12 and R13.

Also, the power factor enhancing circuit 10 includes a smoothing circuit 12 connected to the output of the rectifying circuit 5. The snmoothing circuit 12 is provided with a capacitor C1 for smoothing the DC voltage from the rectifying circuit 5 and resistors R1 and R2 for dividing the voltage charged on the capacitor C1. The capacitor C1 is connected in parallel to the resistors R1 and R2. The voltage divided by the resistors R1 and R2 is used as the external condition, as will be described later in detail.

The switching signal generator 11 is provided in the power factor enhancing circuit 10 to generate a switching signal according to the external condition. The switching signal generator 11 has a pin P1 connected through a resistor R11 to a connection point of the resistors R12 and R13 in the charged voltage detector 13 and a pin P3 connected to a connection point of the resistors R1 and R2 in the smoothing circuit 12. With this construction, the switching signal generator 11 senses a variation in the charged voltage on the smoothing capacitor C6 which is a source for supplying a drive current to the lamp 100 through the lamp driving circuit 40. Also, the switching signal generator 11 senses a variation in the output voltage from the rectifying circuit 5 through the smoothing circuit 12.

The switching signal generator 11 also has a pin P7 connected to a gate of the MOSFET through a resistor R6 and a pin P5 connected to an output port O5 of the microcomputer 30 which outputs a second control signal S2, as will be described later in detail. With this construction, the switching signal generator 11 logically compares the voltages inputted through the pins P1 and P3 with each other and outputs the switching signal of a frequency corresponding to a voltage difference in accordance with the compared result. The MOSFET is operated in response to the switching signal from the switching signal generator 11. As the MOSFET is alternately turned on/off, energy is stored in the primary coil of the transformer 14 and then applied to the resistor R10 through the MOSFET. In the preferred embodiment of the present invention, the resistor R10 has a very high resistance. As a result, most of the energy from the primary coil of the transformer 14 is supplementarily charged on the smoothing capacitor C6 through the diode D2.

Also, the switching signal generator 11 has a pin P4 connected through a resistor R9 to a connection point of the MOSFET and the resistor R10 which is connected in series to the MOSFET, and a pin P8 connected to the rectifying circuit through a resistor R3. With this construction, the switching signal generator 11 discriminates the operated state of the MOSFET by sensing a voltage formed by the resistor R10. Also, the switching signal generator 11 inputs the output voltage from the rectifying circuit 5 as its operating voltage.

The pin P8 is also connected to a secondary coil of the transformer 14 through a diode D1 and a resistor R4. Also, the pin P8 is connected to the ground through a capacitor C3. With this construction, the switching signal generator 11 is supplied with a stable drive voltage or operating voltage from the capacitor C3 which is charged with the DC voltage from the rectifying circuit 5.

The switching signal generator 11 also has a pin P1 connected to the pin P2 through a filtering circuit which is comprised of a capacitor C5 and resistors R7 and R8. The filtering circuit is adapted to remove a noise ripple component from the voltage divided by the resistors R12 and R13 to prevent a faulty operation of the switching signal generator 11.

The lamp driving circuit 40 is connected in parallel to the smoothing capacitor C6 in the power factor enhancing circuit 10. The lamp driving circuit 40 includes a pair of switching circuits 31 and 41 connected in series between a power source and the ground. The switching circuit 31 includes, for example, a transistor TR1 having a collector connected to the power source and a base connected to a first output port O1 of the microcomputer 30. The switching circuit 41 includes, for example, a transistor TR2 having an emitter connected to the ground and a base connected to a second output port O2 of the microcomputer 30. An emitter of the transistor TR1 and a collector of the transistor TR2 are interconnected at a connection point P10 which is connected to one side of the lamp 100 through a choke coil L1.

A diode D3 is connected between the collector and the emitter of the transistor TR1 and a diode D4 is connected between the collector and the emitter of the transistor TR2. The diodes D3 and D4 function to protect the transistors TR1 and TR2 from a high counter electromotive force generated in the choke coil L1, respectively.

The lamp driving circuit 40 also includes a high voltage charging circuit. The high voltage charging circuit is provided with a pair of capacitors C9 and C10 connected in series between the power source and the ground and a pair of series diodes D5 and D6 connected in parallel to the capacitors C9 and C10. The capacitors C9 and C10 are interconnected at a connection point P20 which is connected to the other side of the lamp 100.

A capacitor C8 is connected between both the sides of the lamp 100. The lamp 100 is lighted by a high voltage which is the sum of voltages charged on the capacitors C8–C10.

The constant voltage circuit 20 is connected in parallel to the power factor enhancing circuit 10. The constant voltage circuit 20 includes a resistor R14 and a capacitor C7 connected in series to each other through a connection point P30, and a zener diode ZD connected in parallel to the capacitor C7. A constant voltage Vcc charged on the capacitor C7 is applied to the microcomputer 30 through the connection point P30.

Connected to the microcomputer 30 are the following circuits which detect the external condition.

First, an illumination detecting circuit 50 is connected to an analog/digital (A/D) converter of the microcomputer 30. The illumination detecting circuit 50 is adapted to detect illumination around the lamp 100 or an ambient illumination. The illumination detecting circuit 50 includes an optical sensor 51 having a resistance which is varied according to the ambient illumination, a resistor R15 connected in parallel to the optical sensor 51 and a capacitor C11 for removing a noise component from an output of the optical sensor 51.

The optical sensor 51 has its natural resistance which is varied according to the ambient illumination. The resistor R15 forms a voltage varied with the variation in the resistance of the optical sensor 51. As a result, the microcomputer 30 discriminates the ambient illumination on the basis of the voltage formed by the resistor R15. Then, the microcomputer 30 compares the discriminated ambient illumination with an illumination preset therein and outputs through its output ports O1 and O2 first control signals S1 and S2 of frequencies corresponding to a illumination difference in accordance with the compared result. Namely, if it is discriminated that the ambient illumination is higher than the preset illumination, the microcomputer 30 outputs the first control signals S1 and S2 of lower frequencies to the switching circuits 31 and 41 to lower the illumination of the lamp 100. On the contrary, if it is discriminated that the ambient illumination is lower than the preset illumination, the microcomputer 30 outputs the first control signals S1 and S2 of higher frequencies to the switching circuits 31 and 41 to raise the illumination of the lamp 100.

In the case of raising the illumination of the lamp 100, the microcomputer 30 also outputs the second control signal S3 of a high level through its output port O5 to the pin P5 of the switching signal generator 11 in the power factor enhancing circuit 10. The switching signal generator 11 is enabled in response to the second control signal S3 of the high level from the microcomputer 30 to output the switching signal to the MOSFET, thereby causing the charged voltage on the smooth capacitor C6 to be raised.

In the case of lowering the illumination of the lamp 100, the microcomputer 30 also outputs the second control signal S3 of a low level through its output port O5 to the pin P5 of the switching signal generator 11. Namely, in this case, the lighted state of the lamp 100 is maintained by only the charged voltage on the smoothing capacitor C6. Also in this case, the switching signal generator 11 is disabled regardless of the external condition.

A human body detecting circuit 60 is connected to an input port I1 of the microcomputer 30. The human body detecting circuit 60 includes an infrared-ray sensor 61 for sensing an infrared-ray radiated from a body of the user, a band pass filter 62 for filtering the infrared-ray sensed by the infrared-ray sensor 61 to pass only a frequency component radiated from the human body, and an amplifier 63 for amplifying an output signal from the band pass filter 62 by a predetermined level.

In response to an output signal from the human body detecting circuit 60, the microcomputer 30 discriminates whether the user is present around the lamp 100. If it is discriminated that the user is not present around the lamp 100, the microcomputer 30 mutes the output of the first control signals S1 and S2 through its output ports O1 and O2. As a result, the operations of the switching circuits 31 and 41 in the lamp driving circuit 40 are stopped and the lamp 100 is then turned off.

A key input unit 70 is connected to an input port I3 of the microcomputer 30 to allow the user to control the lamp 100 artificially. The key input unit 70 includes an OFF key for turning off the lamp 100, a MANUAL key for controlling the illumination of the lamp 100 at a plurality of steps according to the number of pushed times regardless of the operation of the illumination detecting circuit 50, and an ALTO key for correcting the illumination value preset in the microcomputer 30.

When the OFF key is pushed by the user, the microcomputer 30 mutes its output ports O1 and O2 to interrupt the flow of the drive current through the lamp 100, thereby causing the lamp 100 to be turned off.

In the case where the MANUAL key is pushed by the user, the illumination of the lamp 100 is controlled regardless of the ambient illumination. Namely, whenever the number of times that the MANUAL key is pushed by the user is incremented, the microcomputer 30 outputs the first control signals S1 and S2 of higher frequencies to increase the amount of the drive current flowing through the lamp 100, thereby making the illumination of the lamp 100 higher.

Although the illumination of the lamp will herein be controlled by ten steps by the MANUAL key for an illustrative purpose, the present invention is not limited thereto. The lamp illumination control steps may be increased or decreased in number according to various uses.

If the MANUAL key is pushed by the user after setting the illumination of the lamp 100 at the highest level the illumination of the lamp 100 returns to the lowest level. Namely, the frequencies of the first control signals S1 and S2 become the lowest values.

The illumination preset in the microcomputer 30 is increased with an increase in the number of times that the AUTO key is pushed by the user. The microcomputer 30 compares the detected ambient illumination from the illumination detecting circuit 50 with the illumination preset by the AUTO key. If the preset illumination is higher than the detected ambient illumination as a result of the comparison, the microcomputer 30 outputs the first control signals S1 and S2 of higher frequencies corresponding to the illumination difference, so as to make the illumination of the lamp 100 higher. On the contrary, if the preset illumination is lower than the detected ambient illumination as a result of the comparison, the microcomputer 30 outputs the first control signals S1 and S2 of lower frequencies corresponding to the illumination difference, so as to make the illumination of the lamp 100 lower.

The key input unit 70 also includes a CLOCK key for setting the current time and an ALARM key for setting an alarm time to allow an alarm signal to be generated at the set alarm time. With this construction, the lamp illumination control apparatus of the present invention can be used more efficiently.

A display unit 80 is connected to an output port O3 of the microcomputer 30 to numerically display the current time, the alarm time and the illumination from the key input unit 70.

An alarm circuit 90 is connected to an output port O4 of the microcomputer 30 to generate the alarm signal or sound at the alarm time set by the ALARM key in the key input unit 70. The alarm circuit 90 includes a switching transistor TR3 and a buzzer BZ. The transistor TR3 has a collector connected to a power source Vcc through a resistor R17, a base connected to the output port O4 of the microcomputer 30 through a resistor R18 and an emitter connected to the ground through the buzzer BZ.

Now, the operation of the lamp illumination control apparatus with the above-mentioned construction in accordance with the embodiment of the present invention will be described in detail.

First, upon receiving the commercial AC power, the rectifying circuit 5 full wave-rectifies the received AC power into the DC power and outputs the DC power to the power factor enhancing circuit 10. In the power factor enhancing circuit 10, the DC voltage containing the ripple component therein is applied to the smoothing capacitor C6 through the primary coil of the transformer 14 and the rectifying diode D2. The DC voltage smoothed by the capacitor C6 is charged on the capacitor C7 of the constant voltage circuit 20 through the resistor R14 thereof. The voltage charged on the capacitor C7 is used as the operating voltage to the microcomputer 30.

The zener diode ZD connected in parallel to the capacitor C7 conducts when the DC voltage from the smoothing capacitor C6 exceeds a capacitance of the capacitor C7, so that the constant voltage from the capacitor C7 can be supplied to the microcomputer 30.

At that time that the microcomputer 30 receives the constant voltage from the capacitor C7, it outputs the first control signals S1 and S2 through its output ports O1 and O2 to the transistors TR1 and TR2 in the lamp driving circuit 40. At this time, the first control signals S1 and S2 have frequencies determined according to a program preset in the microcomputer 30. The transistors TR1 and TR2 are alternately turned on/off in response to the first control signals S1 and S2 from the microcomputer 30. When the transistor TR1 is turned on and the transistor TR2 is turned off, the lamp drive current discharged from the smoothing capacitor C6 is charged on the high voltage charging capacitor C10 through the connection point P10, the choke coil L1 and the capacitor C8. On the contrary, when the transistor TR1 is turned off and the transistor TR2 is turned on, the current discharged from the smoothing capacitor C6 flows to the ground through the high voltage charging capacitor C9, the connection point P20, the capacitor C8, the choke coil L1 and the transistor TR2.

When a period that the transistors TR1 and TR2 are turned on/off is in accord with a resonance period of the choke coil L1 and the capacitors C8–C10 constituting a resonance circuit, a resonance current becomes the maximum in amount. At this time, the lamp 100 is lighted by the high voltage charged on the capacitor C8.

Once the lamp 100 is lighted, the charged voltage on the smoothing capacitor C6 is lowered, while the amount of discharged current flowing through the lamp 100 is increased in amount, because of power consumption of the load or the lamp 100. Namely, the lamp drive voltage and current are out of phase with each other, thereby causing the power factor to become bad. At this time, the switching signal generator 11 in the power factor enhancing circuit 10 is operated to prevent the power factor from becoming bad.

In other words, as the voltage across the smoothing capacitor C6 is lowered, the voltage across the charged voltage detector 13 is lowered and the voltage divided by the resistors R12 and R13 in the charged voltage detector 13 is thus lowered. The switching signal generator 11 inputs the voltage divided by the resistors R12 and R13 at its pin P1 and the voltage divided by the resistors R1 and R2 in the smoothing circuit 12 at its pin P3 and compares the inputted voltages with each other. In the case where a voltage difference or a phase difference between the voltage charged on the smoothing capacitor C6 and the current discharged therefrom is generated in accordance with the compared result, the switching signal generator 11 outputs the switching signal of a frequency corresponding to the voltage difference through its pin P7 to the gate of the MOSFET. In response to the switching signal from the switching signal generator 11, the MOSFET is repeatedly turned on/off at a frequency within the range of several tens KHz to 100 KHz.

Energy is stored in the primary coil of the transformer 14 as a result of the switching operation of the MOSFET. At this time, the higher switching frequency of the MOSFET used, the more energy stored in the primary coil of the transformer 14. The energy stored in the primary coil of the transformer 14 is applied to the smoothing capacitor C6 through the rectifying diode D2, thereby causing the voltage charged on the smoothing capacitor C6 to be raised. As a result, the current to the lamp 100 and the charged voltage on the smoothing capacitor C6 are substantially in phase. Namely, the power factor is enhanced to be approximately 1.

The operation of automatically controlling the illumination of the lamp in conjunction with the ambient illumination will hereinafter be described.

In the illumination detecting circuit 50, the optical sensor 51 has its natural resistance which is varied according to the ambient illumination. The voltage dropped by the resistor R15 is varied with the variation in the resistance of the optical sensor 51. The microcomputer 30 discriminates the ambient illumination on the basis of the voltage dropped by the resistor R15. In the case where the voltage dropped by the resistor R15 is low under the condition that the optical sensor 51 has a positive polarity in which the resistance is increased as the ambient illumination becomes higher, the microcomputer 30 discriminates that the ambient illumination is high. On the contrary, when the voltage dropped by the resistor R15 is high under the condition that the optical sensor 51 has a negative polarity, the microcomputer 30 discriminates that the ambient illumination is high. In order to lower the illumination of the lamp 100 when the ambient illumination is high, the microcomputer 30 outputs the second control signal S3 through its output port O5 to the pin P5 of the switching signal generator 11 in the power factor enhancing circuit 10 so as to disable the switching signal generator 11. In the preferred embodiment of the present invention, the second control signal S3 has a low level to disable the switching signal generator 11. Under the condition that the switching signal generator 11 is disabled, no switching signal is outputted from the pin P7 although the voltages at the pins P1 and P3 are varied.

Under the condition that the switching signal generator 11 is disabled, the charged voltage on the smoothing capacitor C6 is gradually lowered due to the actuation of the lamp 100. As a result, the discharged current flowing through the lamp 100 is decreased in amount, thereby causing the illumination of the lamp 100 to be reduced. Namely, the power consumption can be reduced by reducing the illumination of the lamp 100 when the ambient illumination is high. Also, the microcomputer 30 outputs the first control signals S1 and S2 of the lower frequencies through its output ports O1 and O2 to the switching circuits 31 and 41 in the lamp driving circuit 40, so that the illumination of the lamp 100 can be prevented from being abruptly lowered. As a result, the illumination of the lamp 100 is gradually reduced in such a manner that the user can hardly feel that reduction. This has the effect of protecting a user's eyesight from the illumination of the lamp 100.

On the other hand, in the case where the ambient illumination is lower than the preset illumination, the microcomputer 30 outputs the second control signal S3 of a high level through its output port O5 to the pin P5 of the switching signal generator 11 so as to enable the switching signal generator 11. As enabled in response to the second control signal S3 from the microcomputer 30, the switching signal generator 11 outputs the switching signal through its pin P7 to operate the MOSFET, thereby causing the charged voltage on the smoothing capacitor C6 to be raised. The microcomputer 30 also outputs the first control signals S1 and S2 of higher frequencies through its output ports O1 and O2 to the switching circuits 31 and 41 in the lamp driving circuit 40. As a result, as the larger amount of discharged current flows, the lamp 100 becomes brighter.

The operation of automatically controlling the lighting of the lamp 100 in the case where the user is absent for a long time will hereinafter be described.

When the user is present around the lamp 100, the infrared-ray sensor 61 in the human body detecting circuit 60 senses the infrared-ray radiated from the body of the user. Then in the human body detecting circuit 60, the band pass filter 62 filters the infrared-ray sensed by the infrared-ray sensor 61 to pass only the frequency component radiated from the human body and the amplifier 63 amplifies the output signal from the band pass filter 62 by the predetermined level. The output voltage from the amplifier 63 is dropped by a resistor R20 and then applied to the input port I1 of the microcomputer 30. In response to the voltage dropped by the resistor R20, the microcomputer 30 discriminates whether the user is present around the lamp 100.

On the other hand, in the case where the user is not present around the lamp 100, the input port I1 of the microcomputer 30 is inverted into a low level. The microcomputer 30 counts time preset by the program therein at the moment that the input port I1 thereof is inverted into the low level. The counting of the preset time is performed for the purpose of preventing a faulty operation of the apparatus since the user may be beyond the infrared-ray sensing area for a short time. If the input port I1 remains at its low level even after the lapse of the preset time, the microcomputer 30 discriminates that the user is absent from the area around the lamp 100 for a long time and then turns off the lamp 100. Namely, the microcomputer 30 mutes its output ports O1 and O2 to stop the operations of the transistors TR1 and TR2 in the lamp driving circuit 40. In this case, the drive current to the lamp 100 is interrupted and the lamp 100 is thus turned off.

Then, when the user returns to his position in the infrared-ray sensing area, the input port I1 of the microcomputer 30 is inverted into a high level. In this case, the microcomputer 30 outputs the first control signals S1 and S2 through its output ports O1 and O2, so as to light the lamp 100 again.

Although the control of the illumination and lighting of the lamp has automatically been performed by the illumination detecting circuit, the human body detecting circuit and the microcomputer, it can manually be performed by the key input unit and the microcomputer as will hereinafter be described.

Figure 4:
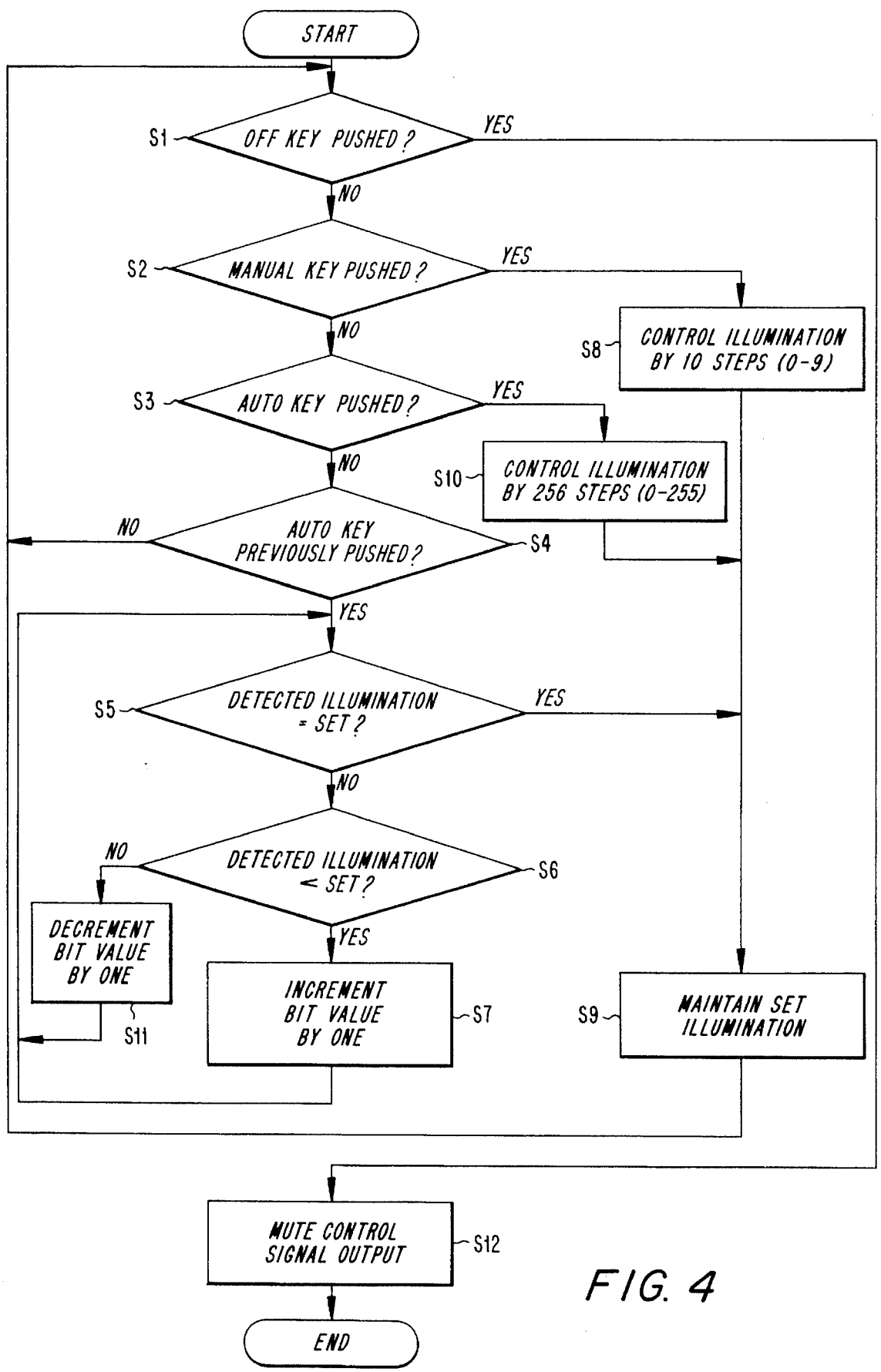
FIG. 4 is a flowchart illustrating a method of controlling the illumination of the lamp in accordance with the embodiment of present invention.

Referring to FIG. 4, there is shown a flowchart illustrating a method of manually controlling the illumination and lighting of the lamp in accordance with the embodiment of the present invention. In this drawing, the reference numeral S designates a step.

First, upon turning on a power switch (not shown), the commercial AC power is supplied to the rectifying circuit 5. Then, the DC voltage rectified by the rectifying circuit 5 is charged on the smoothing capacitor C6 in the power factor enhancing circuit 10. The charged voltage on the smoothing capacitor C6 is applied to the lamp driving circuit 40 and also to the microcomputer 30 through the constant voltage circuit 20. The microcomputer 30 controls the lamp driving circuit 40 to light the lamp 100 and, at the same time, discriminates data from the key input unit 70.

At the step S1, the microcomputer 30 discriminates whether the OFF key has been pushed by the user to turn off the lamp 100 temporarily. If it is discriminated at the step S1 that the OFF key has not been pushed by the user, the microcomputer 30 discriminates at the step S2 whether the MANUAL key has been pushed by the user. On the contrary, if it is discriminated at the step S1 that he OFF key has been pushed by the user, the microcomputer 30 mutes its output ports O1 and O2 to turn off both the transistors TR1 and TR2 in the lamp driving circuit 40. As a result, the drive current to the lamp 100 is interrupted and the lamp 100 is thus turned off.

If it is discriminated at the step S2 that the MANUAL key has not been pushed by the user, the microcomputer 30 discriminates at the step S3 whether the AUTO key has been pushed by the user. On the contrary, if it is discriminated at the step S2 that the MANUAL key has been pushed by the user, the microcomputer 30 raises gradually the frequencies of the first control signals S1 and S2 being outputted through its output ports O1 and O2 at the step S8. In the preferred embodiment of the present invention, the frequency of the switching signal is within the range of several tens KHz to 100 KHz, which is classified by ten steps. However, the range of the frequency may be varied according to various uses of the lamp. Also, the classification of the frequency range may be modified according to a user's preference.

The MANUAL key is, for example, a push button. Whenever the MANUAL key is pushed by the user, the frequency of the switching signal is gradually increased. After reaching the highest value or 100 KHz, the frequency of the switching signal is again gradually increased beginning with the lowest frequency.

As the frequency of the switching signal becomes higher, the drive current to the lamp 100 becomes increases, thereby causing the lamp 100 to become gradually brighter. On the contrary, if the frequency of the switching signal becomes lower, the opposite phenomenon takes place. When the user stops pushing the MANUAL key at an appropriate illumination of the lamp 100, the appropriate illumination of the lamp 100 is maintained at the step S9.

If it is discriminated at the step S3 that the AUTO key has not been pushed by the user, the microcomputer 30 discriminates at the step S4 whether the AUTO key has previously been pushed by the user. On the contrary, if it is discriminated at the step S3 that the AUTO key has been pushed by the user, the microcomputer 30 raises gradually the frequencies of the first control signals S1 and S2 being outputted through its output ports O1 and O2 at the step S10. In the preferred embodiment of the present invention, the frequency of each first control signal is within the range of several tens KHz to 100 KHz, which is subdivided by 256 steps, each of which is expressed as a combination of 8 bits. The frequency of each first control signal is increased to 100 KHz while the AUTO key is pushed by the user. After reaching 100 KHz, the frequency of each first control signal is again gradually increased beginning with the lowest frequency. The AUTO key is, for example, a one-touch key.

As the frequency of each first control signal becomes higher at the step S10, the lamp 100 becomes gradually brighter. On the contrary, if the frequency of each first control signal becomes lower, the lamp 100 becomes gradually darker. When the user stops pushing the AUTO key at an appropriate illumination of the lamp 100, the appropriate illumination of the lamp 100 is maintained at the step S9.

If it is discriminated at the step S4 that the AUTO key has not previously been pushed by the user, the microcomputer 30 returns to the step S1 to perform the above operation repeatedly. On the contrary, if it is discriminated at the step S4 that the AUTO key has previously been pushed by the user, the microcomputer 30 discriminates at the step S5 whether the illumination sensed by the optical sensor 51 in the illumination detecting circuit 50 is in accord with the illumination set by the AUTO key.

If YES at the step S5, the illumination of the lamp 100 is appropriately maintained at the step S9. On the contrary, if NO at the step S5, the microcomputer 30 discriminates at the step S6 whether the illumination set by the AUTO key is higher than the illumination sensed by the optical sensor 51. If it is discriminated at the step S6 that the illumination set by the AUTO key is higher than the illumination sensed by the optical sensor 51, the microcomputer 30 at the step S7 increments a value of the 8 bits by one to raise the frequency of each first control signal, so as to make the illumination of the lamp 100 higher. On the contrary, if it is discriminated at the step S6 that the illumination set by the AUTO key is lower than the illumination sensed by the optical sensor 51, the microcomputer 30 at the step S11 decrements a value of the 8 bits by one to lower the frequency of each first control signal, so as to make the illumination of the lamp 100 lower.

In the case where the illumination of the lamp 100 is appropriately selected by the MANUAL key or the AUTO key, the corresponding numerals are displayed on the display unit 80. Therefore, the user can recognize the selected illumination of the lamp 100 through the display unit 80.

Figure 5:
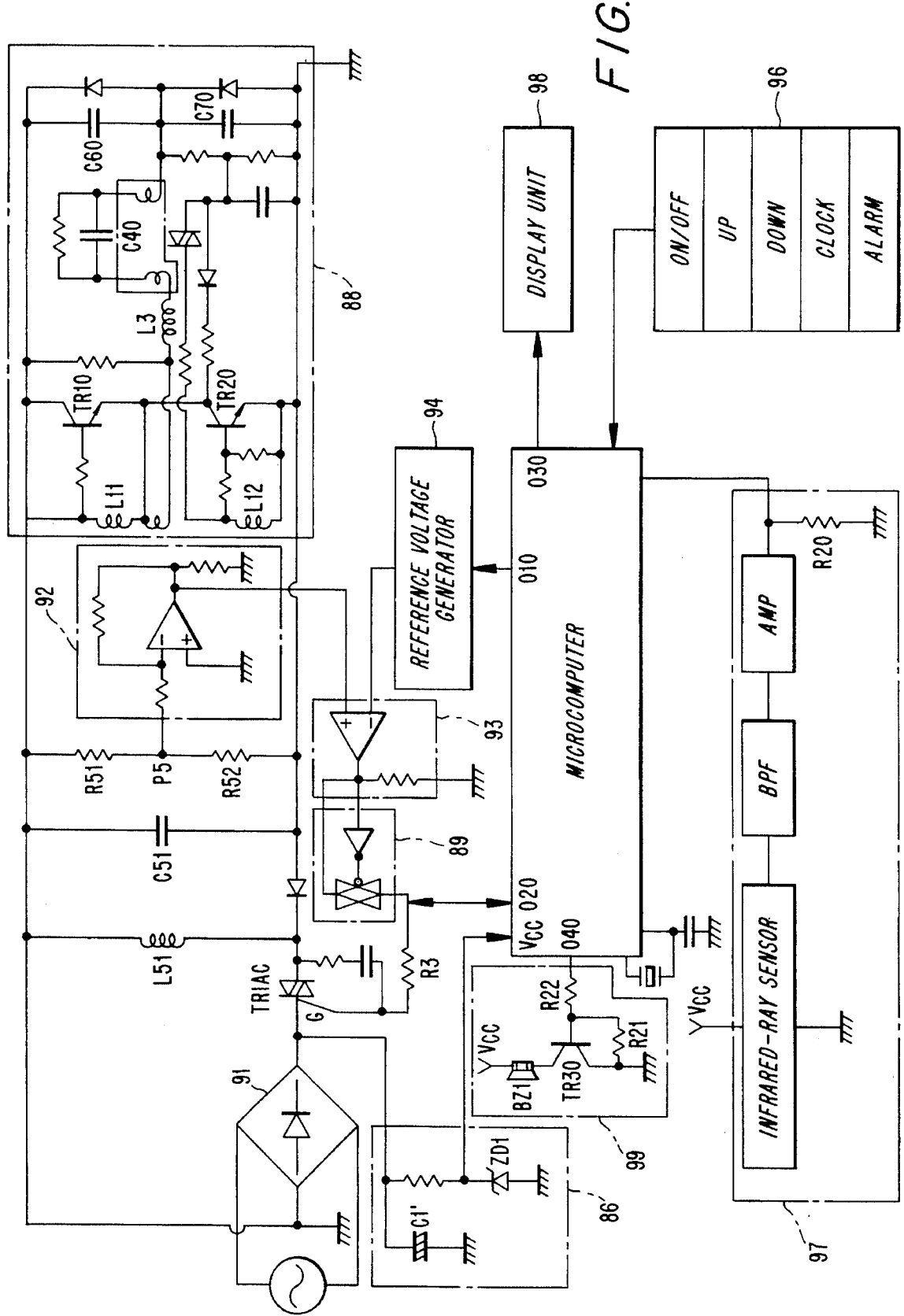
FIG. 5 is a detailed circuit diagram of the apparatus for controlling the illumination of the lamp in accordance with an alternative embodiment of the present invention.

Referring to FIG. 5, there is shown a detailed circuit diagram of the lamp illumination control apparatus in accordance with an alternative embodiment of the present invention. As shown in this drawing, the lamp illumination control apparatus comprises a rectifying circuit 91 for full wave-rectifying a commercial AC voltage into a DC voltage containing a ripple component therein. The rectifying circuit 91 is connected to a power terminal Vcc of a microcomputer 95 through a constant voltage circuit 86 which is comprised of a capacitor C1' and a zener diode ZD1. The rectifying circuit 91 is also connected to an inductor L51 through a triac, a gate G of which is connected to an output port O20 of the microcomputer 95. When the triac is turned on under the control of the microcomputer 95, stored in the inductor L51 is energy resulting from the ripple component of the DC voltage which is in an AC form. Then, when the triac is turned off, the energy stored in the inductor L51 is charged on a smoothing capacitor C51.

The smoothing capacitor C51 is connected through a lamp driving circuit 88 to the lamp 101. The lamp driving circuit 88 includes a pair of transistors TR10 and TR20 connected symmetrically to each other, a transformer having a primary coil L11 connected between a base and an emitter of the transistor TR10 and a secondary coil L12 connected between a base and an emitter of the transistor TR20, and a high voltage charging circuit. The high voltage charging circuit is provided with a capacitor C40 connected across the lamp 101 and capacitors C60 and C70 connected in parallel to the capacitor C40. The lamp 101 is lighted by a push-pull operation of the transistors TR10 and R20 in the lamp driving circuit 88.

Namely, upon application of a drive voltage, one of the transistors TR10 and TR20, for example, the transistor TR10 is turned on due to a self-vibration. In this case, a current discharged from the smoothing capacitor C51 is charged on the high voltage charging capacitor C70 through a choke coil L3 and the capacitor C40. Then, if the transistor TR10 is turned off and the transistor TR20 is turned on due to a mutual induction effect of the transformer, the discharged current from the smoothing capacitor C51 flows to the ground through the high voltage charging capacitor C60, the capacitor C40, the choke coil L3 and the transistor TR20.

When a period that the transistors TR10 and TR20 are turned on/off is in accord with a resonance period of the choke coil L3 and the capacitors C40, C60 and C70 constituting a resonance circuit, a resonance current becomes the maximum in amount. At this time, the lamp 101 is lighted by a high voltage charged on the capacitor C40.

A charged voltage detecting circuit includes resistors R51 and R52 interconnected at a connection point P5 which is connected to a non-inverting input terminal (+) of a comparator 93 through an operational amplifier 92. The charged voltage detecting circuit is connected in parallel to the smoothing capacitor C51. The charged voltage detecting circuit detects the voltage charged on the smoothing capacitor C51 and outputs the detected voltage through the operational amplifier 92 to the non-inverting input terminal (+) of the comparator 93, an inverting input terminal (−) of which is connected to an output port O10 of the microcomputer 95 through a reference voltage generator 94.

The microcomputer 95 outputs to the reference voltage generator 94 a signal corresponding to an illumination from a key input unit 96 which is set by the user. In response to the output signal from the microcomputer 95, the reference voltage generator 94 generates a reference voltage corresponding to the illumination set by the user and applies the generated reference voltage to the inverting input terminal (−) of the comparator 93.

The comparator 93 compares the detected voltage from the charged voltage detecting circuit with the reference voltage from the reference voltage generator 94. When an UP key in the key input unit 96 is pushed by the user to raise the illumination of the lamp 101, the reference voltage from the reference voltage generator 94 becomes higher than the detected voltage from the charged voltage detecting circuit. In this case, the comparator 93 outputs a negative signal through an analog switch 89 to the gate G of the triac. The triac is turned off in response to the negative signal from the comparator 93, thereby causing the energy stored in the inductor L51 to be applied to the smoothing capacitor C51. As a result, the voltage charged on the smoothing capacitor C51 is raised the amount of a drive current from the smoothing capacitor C51 to the lamp 101 is increased and the illumination of the lamp 101 is thus raised.

As the charged voltage on the smoothing capacitor C51 is raised, the voltage detected by the charged voltage detecting circuit becomes higher. At the moment that the detected voltage from the charged voltage detecting circuit is higher than the reference voltage from the reference voltage generator 94, the comparator 93 outputs a positive signal, thereby causing the triac to be turned on. As a result, the charging of the smoothing capacitor C51 is blocked and the set illumination of the lamp 101 is thus maintained.

Then, when the detected voltage from the charged voltage detecting circuit becomes lower than the reference voltage from the reference voltage generator 94 as the charged voltage on the smoothing capacitor C51 is lowered due to power consumption of the lamp 101, the comparator 93 outputs the negative signal, thereby causing the triac to be turned off. As a result, the energy stored in the inductor L51 is again applied to the smoothing capacitor C51.

As mentioned above, the triac is repeatedly turned on/off according to the variation in the charged voltage on the smoothing capacitor C51, so that the illumination of the lamp 101 can be maintained at the set value.

Also, the power factor of the lamp can be enhanced. Namely, energy is stored in the inductor L51 as a result of the switching operation of the triac. At this time, the higher switching frequency of the triac used, the more energy stored in the inductor L51. The energy stored in the inductor L51 is applied to the smoothing capacitor C51, thereby causing the voltage charged on the smoothing capacitor C51 to be raised. As a result, the current to the lamp 101 and the charged voltage on the smoothing capacitor C51 are substantially in phase. Namely, the power factor is enhanced to be approximately 1.

In the case where a DOWN key in the key input unit 96 is pushed by the user to lower the illumination of the lamp 101, the microcomputer 96 outputs to the reference voltage generator 94 through its output port O10 a signal corresponding to an illumination set by the DOWN key. In response to the output signal from the microcomputer 95, the reference voltage generator 94 generates the reference voltage corresponding to the illumination set by the DOWN key and applies the generated reference voltage to the inverting input terminal (−) of the comparator 93. In this case, the detected voltage from the charged voltage detecting circuit is higher than the reference voltage from the reference voltage generator 94 because the illumination of the lamp 101 is intended to be lowered. As a result, the comparator 93 outputs the positive signal, thereby causing the triac to be turned on. The turning-on of the triac results in blockage of the energy supply from the inductor L51 to the smoothing capacitor C51. At this time, the charged voltage on the smoothing capacitor C51 is gradually lowered due to power consumption of the lamp 101 and the illumination of the lamp 101 is thus gradually lowered. Then, the illumination of the lamp 101 is maintained at the set value at a certain point of time.

The key input unit 96 also includes a CLOCK key for setting the current time and an ALARM key for setting an alarm time to allow an alarm signal to be generated at the set alarm time.

A display unit 98 is connected to an output port O30 of the microcomputer 95 to numerically display the current time, the alarm time and the illumination from the key input unit 96.

An alarm circuit 99 is connected to an output port O40 of the microcomputer 95 to generate the alarm signal or sound at the alarm time set by the ALARM key in the key input unit 96. The alarm circuit 99 includes a switching transistor TR30 and a buzzer BZ1. The transistor TR30 has a collector connected to a power source Vcc through the buzzer BZ1, a base connected to the output port O40 of the microcomputer 30 through a resistor R22 and an emitter connected to the ground. A bias resistor R21 is connected between the emitter and the base of the transistor TR30.

A human body detecting circuit 97 is connected to the microcomputer 95. The human body detecting circuit 97 includes an infrared-ray sensor for sensing an infrared-ray radiated from a body of the user, a band pass filter for filtering the infrared-ray sensed by the infrared-ray sensor to pass only a frequency component radiated from the human body, and an amplifier for amplifying an output signal from the band pass filter by a predetermined level.

In response to an output signal from the human body detecting circuit 97, the microcomputer 95 discriminates whether the user is present around the lamp 101. If it is discriminated that the user is not present around the lamp 101, the microcomputer 95 outputs a trigger pulse to the gate G of the triac through its output port O20, thereby causing the triac to be turned on. The turning-on of the triac results in blockage of the energy supply from the inductor L51 to the smoothing capacitor C51. As a result, the charged voltage on the smoothing capacitor C51 is gradually lowered due to power consumption of the lamp 101 and the illumination of the lamp 101 is thus gradually lowered. Then, in the case where the energy from the inductor L51 is not supplied to the smoothing capacitor C51 even after several seconds, the charged voltage on the smoothing capacitor C51 becomes lower than a level capable of driving the lamp 101. In result, the lamp 101 is turned off.

Then, when the user returns to his position in the infrared-ray sensing area, the microcomputer 95 mutes the output of the trigger pulse through its output port O20 and, at the same time, the comparator 93 outputs the negative pulse to turn off the triac. As a result, the energy stored in the inductor L51 is again applied to the smoothing capacitor C51 and the lamp 101 is thus lighted again.

As apparent from the above description, according to the present invention, the illumination of the lamp is controlled on the basis of the detected ambient illumination so that the user's eyesight can be protected from the illumination of the lamp. Also, the lamp is turned off in the user's absence so that the unnecessary power consumption can be reduced. Further, the lamp drive voltage is in phase with the current flowing through the lamp when the lamp remains at its lighted state or the illumination thereof is varied manually or automatically, so that the power factor can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling illumination of a lamp, comprising:

means for detecting an ambient illumination;

means for detecting an infrared-ray radiated from a body of the user to discriminate whether the user is present around the lamp and generating a signal indicative of presence of the user around the lamp in accordance with the detected result;

control means for comparing the detected ambient illumination from said illumination detecting means with an illumination preset therein and outputting a pair of first control signals and a second control signal in accordance with the compared result, each of the first control signals having a frequency which is varied according to the compared result, the second control signal having a first or second level according to the compared result, said control means discriminating in response to an output signal from said infrared-ray detecting means whether the user is present around the lamp and muting the output of the first control signals when the user is not present around the lamp as a result of the discrimination, so as to turn off the lamp;

means for rectifying a commercial AC voltage into a DC voltage;

power factor enhancing means having a smoothing capacitor charged with the DC voltage from said rectifying means, a switching signal generator enabled in response to the second control signal of the first level from said control means and disabled in response to the second control signal of the second level from said control means, for generating a switching signal when the voltage charged on said smoothing capacitor is out of phase with a drive current discharged from said smoothing capacitor to the lamp, a switching device driven in response to the switching signal from said switching signal generator and a transformer for generating a high voltage when said switching device is driven, said power factor enhancing means allowing the charged voltage on said smoothing capacitor and the drive current discharged therefrom to the lamp to be in phase with each other; and lamp driving means having a pair of switching circuits for controlling the flow of the drive current from said smoothing capacitor in said power factor enhancing means to the lamp in response to the first control signals from said control means and a high voltage charging circuit charged with the drive current from said smoothing capacitor;

said control means outputting the first control signals of higher frequencies and the second control signal of the first level if it is discriminated that the preset illumination is higher than the detected ambient illumination from said illumination detecting means and outputting the first control signals of lower frequencies and the second control signal of the second level if it is discriminated that the preset illumination is lower than the detected ambient illumination from said illumination detecting means.

2. An apparatus for controlling an illumination of a lamp, as set forth in claim 1, further comprising:

input means having MANUAL and AUTO keys, said control means outputting the first control signals of the higher frequencies when said MANUAL key is operated, comparing an illumination set by said AUTO key with the detected ambient illumination from said illumination detecting means when said AUTO key is operated, outputting the first control signals of the higher frequencies if the illumination set by said AUTO key is higher than the detected ambient illumination from said illumination detecting means and outputting the first control signals of the lower frequencies if the illumination set by said AUTO key is lower than the detected ambient illumination from said illumination detecting means.

3. An apparatus for controlling an illumination of a lamp, as set forth in claim 2, further comprising:

alarm means connected to an output of said control means, for generating an alarm signal, said input means further including an OFF key for turning off the lamp, a CLOCK key for setting the current time and an ALARM key for setting an alarm time to allow said alarm means to generate the alarm signal at the set alarm time, said control means muting the output of the first control signals when said OFF key is operated.

4. An apparatus for controlling an illumination of a lamp, as set forth in claim 3, further comprising:

display means connected to a different output of said control means, for displaying the illumination set by said MANUAL or AUTO key, the current time set by said CLOCK key and the alarm time set by said ALARM key.

5. A method of controlling an illumination of a lamp, as set forth in claim 1, wherein the preset illumination at said illumination control step can artificially be varied by the user.

6. An apparatus for controlling illumination of a lamp, comprising:

first means for detecting ambient illumination;

second means for detecting presence of a user in an area surrounding the lamp and generating a signal indicative of the presence or absence of the user;

control means for comparing the detected ambient illumination received from said first detecting means with a predetermined illumination threshold, outputting control signals in accordance with the comparison, turning off the lamp in response to receiving said signal indicative of the absence of the user, and controlling the illumination of said lamp in response to the comparison of the detected ambient illumination and the predetermined illumination threshold;

power factor enhancing means for causing a lamp drive current and a lamp drive voltage to be in phase with one another;

lamp driving means for controlling flow of the lamp drive current from said power factor enhancing means to said lamp in response to said control signals and for lighting said lamp by outputting a voltage to said lamp; and means for rectifying a commercial AC voltage into the lamp drive voltage;

wherein said power factor enhancing means comprises:

a smoothing capacitor charged with the lamp drive voltage received from said rectifying means;

a switching signal generator enabled in response to a first level of said control signals received from said control means and disabled in response to a second level of said control signals, for generating a switching signal when the lamp drive voltage charged on said smoothing capacitor is out of phase with the lamp drive current discharged from said smoothing capacitor to said lamp;

a switching device driven in response to the switching signal received from said switching signal generator; and a transformer connected to said switching device for generating a high voltage when said switching device is driven; and wherein said lamp driving means comprises:

a pair of switching circuits for controlling the flow of the drive current from said smoothing capacitor in said power factor enhancing means to the lamp; and a high voltage charging circuit charged with the drive current from said smoothing capacitor.

7. An apparatus for controlling illumination of a lamp, as set forth in claim 6, wherein said control means outputs said control signals having predetermined levels depending on whether the predetermined illumination threshold is higher than the detected ambient illumination or whether the predetermined illumination threshold is lower than the detected ambient illumination.

8. An apparatus for controlling illumination of a lamp, as set forth in claim 6, further comprising:

input means having manual and auto keys, said control means outputting control signals having relatively higher frequencies when said manual key is operated, comparing an illumination set by said auto key with the detected ambient illumination when said auto key is operated, outputting said control signals having relatively higher frequencies if the illumination set by said auto key is higher than the detected ambient illumination and output control signals having relatively lower frequencies if the illumination set by said auto key is lower than the detected ambient illumination.

9. An apparatus for controlling illumination of a lamp, as set forth in claim 8, further comprising:

alarm means connected to a first output of said control means for generating an alarm signal;

said input means further comprising:

an off key for turning off the lamp;

a clock key for setting current time; and an alarm key for setting an alarm time to allow said alarm means to generate the alarm signal at the set alarm time; and wherein said control means mutes the output of said control signals when said off key is operated.

10. An apparatus for controlling illumination of a lamp, as set forth in claim 9, further comprising:

display means connected to a second output of said control means for displaying the illumination set by said manual or auto keys, the current time set by said clock key and the alarm time set by said alarm key.

11. A method of controlling illumination of a lamp, comprising the steps of:

detecting ambient illumination;

outputting a pair of first control signals of relatively higher frequencies to lamp driving means to increase an amount of a lamp drive current and outputting a second control signal of a first level to power factor enhancing means to raise the illumination of the lamp, if the detected ambient illumination is lower than a preset illumination, and outputting the first control signals of lower frequencies to said lamp driving means to reduce the amount of the lamp drive current and outputting the second control signal of a second level to said power factor enhancing means to lower the illumination of the lamp, if the detected ambient illumination is higher than the preset illumination;

detecting presence or absence of a user in an area surrounding the lamp;

outputting the second control signal of the second level to said power factor enhancing means and muting the output of the first control signals, in response to detecting the absence of a user so as to turn off the lamp;

enabling a switching signal generator in response to a second control signal having a first level;

using the switching signal generator to monitor a voltage phase condition of a voltage charged on a smoothing capacitor and to monitor a current phase condition of a lamp drive current from the smoothing capacitor, thereby generating switching signal; and enabling a switching device in response to the switching signal.

12. A method of controlling illumination of a lamp, as set forth in claim 1, wherein the preset illumination can be manually varied by the user.

13. An apparatus for controlling an illumination of a lamp, comprising:

means for detecting an ambient illumination;

means for detecting an infrared-ray radiated from a body of the user to discriminate whether the user is present around the lamp and generating a signal indicative of presence of the user around the lamp in accordance with the detected result;

control means for comparing the detected ambient illumination from said illumination detecting means with an illumination preset therein and outputting a pair of first control signals and a second control signal in accordance with the compared result, each of the first control signals having a frequency which is varied according to the compared result, the second control signal having a first or second level according to the compared result, said control means discriminating in response to an output signal from said infrared-ray detecting means whether the user is present around the lamp and muting the output of the first control signals when the user is not present around the lamp as a result of the discrimination, so as to turn off the lamp;

means for rectifying a commercial AC voltage into a DC voltage;

power factor enhancing means having a smoothing capacitor charged with the DC voltage from said rectifying means, a switching signal generator enabled in response to the second control signal of the first level from said control means and disabled in response to the second control signal of the second level from said control means, for generating a switching signal when the voltage charged on said smoothing capacitor is out of phase with a drive current discharged from said smoothing capacitor to the clamp, a switching device driven in response to the switching signal from said switching signal generator and a transformer for generating a high voltage when said switching device is driven, said power factor enhancing means allowing the charged voltage on said smoothing capacitor and the drive current discharged therefrom to the lamp to be in phase with each other;

lamp driving means having a pair of switching circuits for controlling the flow of the drive current from said smoothing capacitor in said power factor enhancing means to the lamp in response to the first control signals from said control means and a high voltage charging circuit charged with the drive current from said smoothing capacitor;

said control means outputting the first control signals of higher frequencies and the second control signal of the first level if it is discriminated that the present illumination is higher than the detected ambient illumination from said illumination detecting means and outputting the first control signals of lower frequencies and the second control signal of the second level if it is discriminated that the present illumination is lower than the detected ambient illumination from said illumination detecting means, and input means having MANUAL and AUTO keys, said control means outputting the first control signals of the higher frequencies when said MANUAL key is operated, comparing an illumination set by said AUTO key with the detected ambient illumination from said illumination detecting means when said AUTO key is operated, outputting the first control signals of the higher frequencies if the illumination set by said AUTO key is higher than the detected ambient illumination from said illumination detecting means and outputting the first control signals of the lower frequencies if the illumination set by said AUTO key is lower than the detected ambient illumination from said illumination detecting means.

14. A method of controlling illumination of a lamp, comprising the steps of:

detecting an ambient illumination;

outputting a pair of first control signals of higher frequencies to lamp driving means to increase an amount of a lamp drive current and outputting a second control signal of a first level to power factor enhancing means to raise the illumination of the lamp, if the detected ambient illumination is lower than a preset illumination, which can be manually varied by the user and outputting the first control signals of lower frequencies to said lamp driving means to reduce the amount of the lamp drive current and outputting the second control signal of a second level to said power factor enhancing means to lower the illumination of the lamp, if the detected ambient illumination is higher than the preset illumination;

detecting an infrared-ray radiated from a body of the user to discriminate whether the user is present around the lamp;

outputting the second control signal of the second level to said power factor enhancing means and muting the output of the first control signals, if it is discriminated at said user detecting step that the user is not present around the lamp, so as to turn off the lamp;

enabling a switching signal generator in response to a second control signal having a first level;

using the switching signal generator to monitor a voltage phase condition of a voltage charged on a smoothing capacitor and to monitor a current phase condition of a lamp drive current from the smoothing capacitor, thereby generating switching signal; and enabling a switching device in response to the switching signal.

* * * * *